United States Patent [19]

Baudoin

[11] Patent Number: 5,406,557
[45] Date of Patent: Apr. 11, 1995

[54] INTERENTERPRISE ELECTRONIC MAIL HUB

[75] Inventor: Claude R. Baudoin, Palo Alto, Calif.

[73] Assignee: National Semiconductor Corporation, Santa Clara, Calif.

[21] Appl. No.: 11,929

[22] Filed: Feb. 1, 1993

[51] Int. Cl.$^6$ .................. H04L 12/54; G06F 13/00
[52] U.S. Cl. ........................... 370/61; 370/79; 370/85.13; 370/94.3; 379/94; 395/200
[58] Field of Search ............... 370/58.1, 58.2, 58.3, 370/60, 61, 79, 85.13, 85.14, 94.1, 94.3, 110.1; 379/88, 89, 93, 94, 96, 100; 395/200; 358/400, 402, 425, 442, 443, 445

[56] References Cited

U.S. PATENT DOCUMENTS

| | | | |
|---|---|---|---|
| 4,672,459 | 6/1987 | Kudo | 370/61 |
| 4,674,085 | 6/1987 | Aranguren et al. | 370/94.3 |
| 4,677,611 | 6/1987 | Yanosy, Jr. et al. | 370/85.13 |
| 4,922,486 | 5/1990 | Lidinsky et al. | 370/94.1 |
| 5,182,748 | 1/1993 | Sakata et al. | 370/79 |

FOREIGN PATENT DOCUMENTS

| | | | |
|---|---|---|---|
| 0001659 | 1/1990 | Japan | 370/61 |
| 0123240 | 5/1991 | Japan | 370/61 |
| 0129946 | 6/1991 | Japan | 370/61 |

OTHER PUBLICATIONS

Baudoin, "The Sematech Electronic Mail System", *Proceedings of the Digital Equipment Computer Users Society*, pp. 221-231, (1989).

*Primary Examiner*—Alpus Hsu
*Attorney, Agent, or Firm*—Townsend and Townsend Khourie and Crew

[57] ABSTRACT

An interenterprise communications center has a computer hub comprising a common core and a plurality of input and output modules. The input modules connect to a first end user and converts a message sent by the first end user into a universal format. The hub core queues the message and forwards it to the output module for conversion into the format of the destination user.

16 Claims, 7 Drawing Sheets

Message sent by Joe using VMSmail

From: ENT400: :Joe          "Joe Smith"    4-AUG-1992 19:59:02.81
To:   HUB: :PROFS: :ENT420: :ERIN
CC:   JOE
Subj: Test message Erin, This message was composed using VMSmail on our VAX called ENT400.
I am sending it to your PROFS account at entity 420.

Regards,
Joe.

Message received by Erin using PROFS

From: Joe —ENT400  Date and time 08/04/92 20:02:23
To: Erin —ENT420

From: Joe —ENT400  Joe Smith
Subject: Test message

Erin,

This message was composed using VMSmail on our VAX called ENT400.
I am sending it to your PROFS account at entity 420.

Regards,
Joe.

to:   HUB: :PROFS: :ENT420: :ERIN

Filler A: 11 bytes, hexadecimal 'FE' followed by EBCDIC "MSG: FROM"
Filler B: 5 bytes, EBCDIC "TO:"
Filler C: 10 bytes, EBCDIC spaces
Filler D: 1 byte, EBCDIC space
Filler E: 6 bytes, hexadecimal 'FF0000007F7F'
Filler F: 9 bytes, hexadecimal '0D7F7F7F7F7F7F7F7F'
Date and time: 17 bytes, EBCDIC, format "mm/dd/yy hh:mm:ss"

INTERENTERPRISE ELECTRONIC MAIL HUB

BACKGROUND OF THE INVENTION

This invention relates to electronic mail and in particular to electronic mail on wide area networks, including between multiple incompatible electronic mail applications.

Electronic mail, or E-Mail is a means of sending electronic messages from one computer user to another. E-Mail has advantages of convenience, format, and storage for later retrieval not available with other forms of communication and has proved to be an important facilitator of interoffice communications.

The convenience and efficiency of E-Mail has placed E-Mail in widespread use but it has typically been limited to users located within a single company or organization and remains relatively underutilized between users located in different companies or organizations. Many barriers exist between the users in different organizations that prevent communication via this electronic medium. For example, users may be using different E-Mail systems having different protocols for addressing and formatting messages. Furthermore, even if similar E-Mail protocols were used, there also remains the very real problem of assigning each user a unique address and of developing some central piece of hardware and/or software that could route the messages from an address in one company to an address at another company.

All of the aforementioned obstacles have forced those wishing electronic mail interconnectivity between enterprises to develop and engineer their own piecemeal solutions. These users thus develop a system useful only for the specific interconnection desired and do not necessarily have add on capability to interface with users other than the specific user targeted. Interfacing with another enterprise requires that the process of engineering an interface begin again and much time and effort is wasted. In addition, the developer of this solution, typically an end user, does not have the system wide control or vantage point with which to effectively manage the interface or provide the software and system support. Thus, most organizations that might benefit from interenterprise communications find it too costly to set up and manage an interenterprise electronic communication capability or are led to believe that it is actually impossible to do so. In particular, smaller organizations, (10-100 people) often have no electronic mail system and resort to an inordinate amount of telephone and manual FAX communication to communicate with their correspondents.

SUMMARY OF THE INVENTION

The present invention provides a prepackaged electronic communications gateway, that enables users to communicate via electronic mail with a variety of other electronic mail users located in different locales and/or using different E-Mail protocols. The present invention is a comprehensive system architecture that results in electronic mail connectivity between one or more electronic mail systems within an enterprise, or between external communities, via one or more networks through a central system.

The central system of the present invention permits enterprises to purchase a communications service without worrying about engineering a separate solution to their interconnection needs. The central system of the present invention also permits centralized configuration, control and servicing of the interfaces.

According to one aspect of the present invention, an electronic communication center (ECC) is provided that serves as a hub for routing messages. The ECC comprises a message queue, a queue management system, an address table and a plurality of translation modules. The ECC converts all incoming E-Mail messages to a non-user specific standard protocol. Then, based upon the destination address, the ECC converts the nonstandard protocol to the appropriate protocol for each destination user.

According to another aspect of the present invention, the ECCs may be networked together to provide intra-company, inter-site message delivery across private or public communication media, with either centralized or distributed access to the customer's outside correspondents.

According to another aspect of the present invention, the ECC may be assembled from off-the-shelf hardware. Existing software may be used to translate between network protocols and perform system management tasks. In this manner the present invention may be realized quickly and economically.

According to yet another aspect of the present invention, the ECC may also be used to route messages to any facsimile machine.

Other features and advantages of the present invention will become apparent from the detailed description and the claims below.

DESCRIPTION OF THE PREFERRED EMBODIMENT

System Overview

Figure 1:
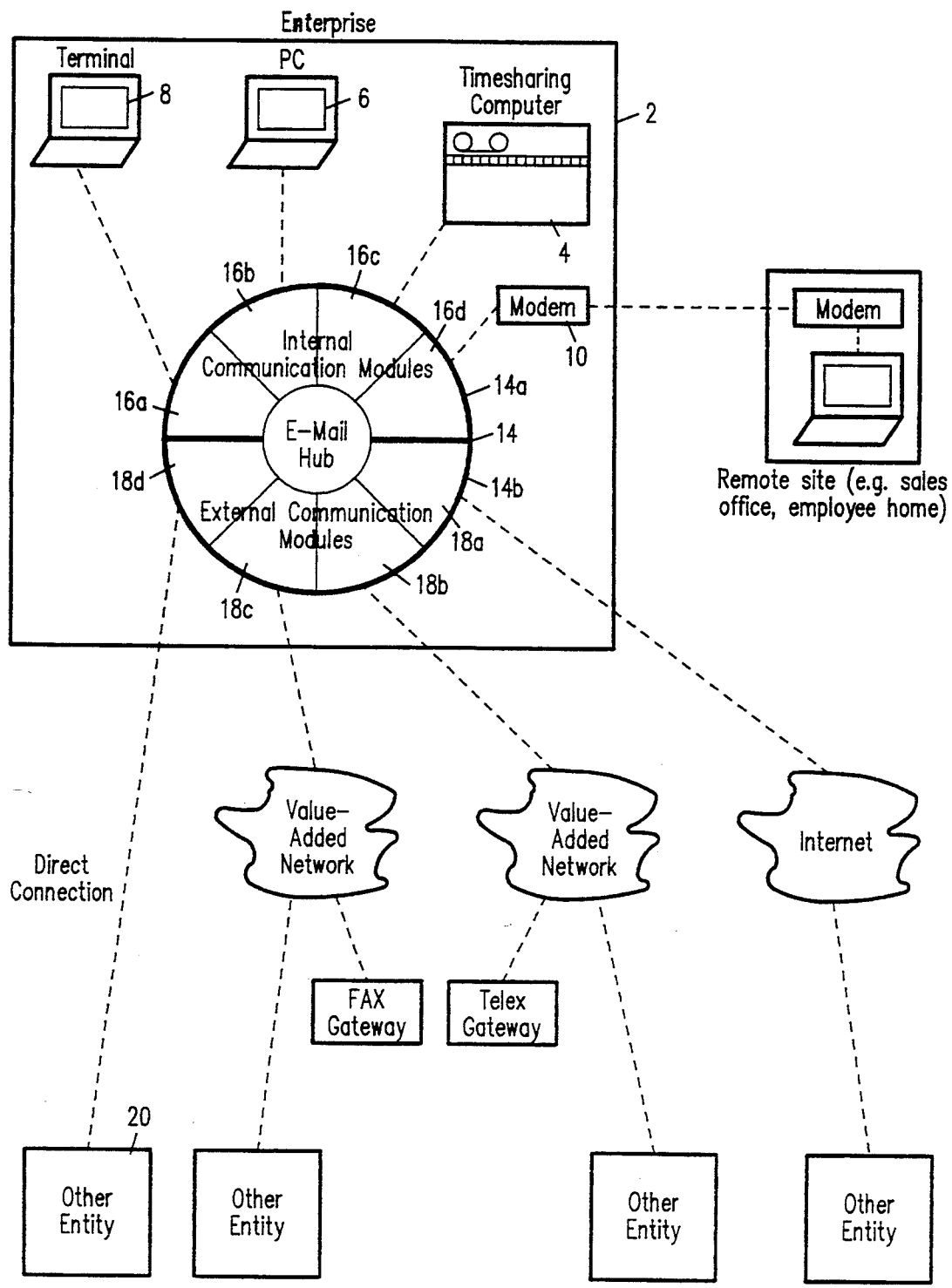
FIG. 1 is a conceptual drawing of an ECC system architecture according to an embodiment of the present invention.

FIG. 1 is a conceptual drawing of an ECC system architecture according to an embodiment of the present invention. Box 2 shows an enterprise that wishes to communicate electronically with entities and users located outside of enterprise 2. Enterprise 2 may contain a variety of electronic communications equipment through which messages may be created or read. For example, enterprise 2 may include a timesharing computer 4, a personal computer 6, a "dumb" terminal 8, and modems 10 that allow access by company personnel located offsite. Other forms of communication equipment, not shown, are possible and may be used with the present invention. The communications equipment of enterprise 2 connects to a communications hub 14. The hardware component of hub 14 maybe a mini, mainframe or microcomputer.

Hub 14 comprises a plurality of communications modules useful for interfacing with the individual pieces of communications equipment. Each piece of communication equipment internal to enterprise 2 connects to one of internal communication modules 16. Table 1 lists the variety of ways in which equipment can connect to hub 14. Network interfaces and communication equipment external to enterprise 2 connect to one of the external communication modules 18. In this manner hub 14 may be thought of as divided into two halves: an internal communication half 14a and an external communication half 14b.

Each of the internal communications modules 16 converts message and information data between a "universal" format and protocol internal to hub 14 and the protocol and format used by the associated piece of communications equipment. For example, timesharing computer 4 may be using an IBM PROFS® E-mail protocol. The PROFS software is an E-mail protocol developed by IBM and other E-Mail protocols developed by other vendors may be incompatible with the PROFS software. A message sent from timesharing computer 4 is converted from the PROFS protocol to the universal format used within hub 14 by internal communications module 16c.

Hub 14 looks at the destination address for the message received from timesharing computer 4 and routes that message to the appropriate external communications module 18. External communications module 18 converts the universal format message into the specific message format and protocol required by the end user. For example, if the message from timesharing computer 4 is destined for another entity 20, internal communications module 18d converts the message into the protocol required by entity 20.

A message sent from entity 20 to a user of timesharing computer 4 undergoes the same operations only in reverse. External communications module 18d converts the incoming message to the universal format used by hub 14. Internal communications module 16b then converts the universal format into the particular format required to interface with timesharing computer 4.

External communications modules 18 may be used to connect to a variety of communications systems. External communication module 18d is shown with a direct, or hardwired, connection to another entity. Modules 18b and 18c connect to a value added network which may be used as connections to other entities or to fax and/or telex gateways. Module 18a connects to the Internet, another network link useful for interfacing with another entity. Communications links other than those shown are possible. Table 1 lists some of the various possible methods for providing an external link to hub 14.

Figure 2:
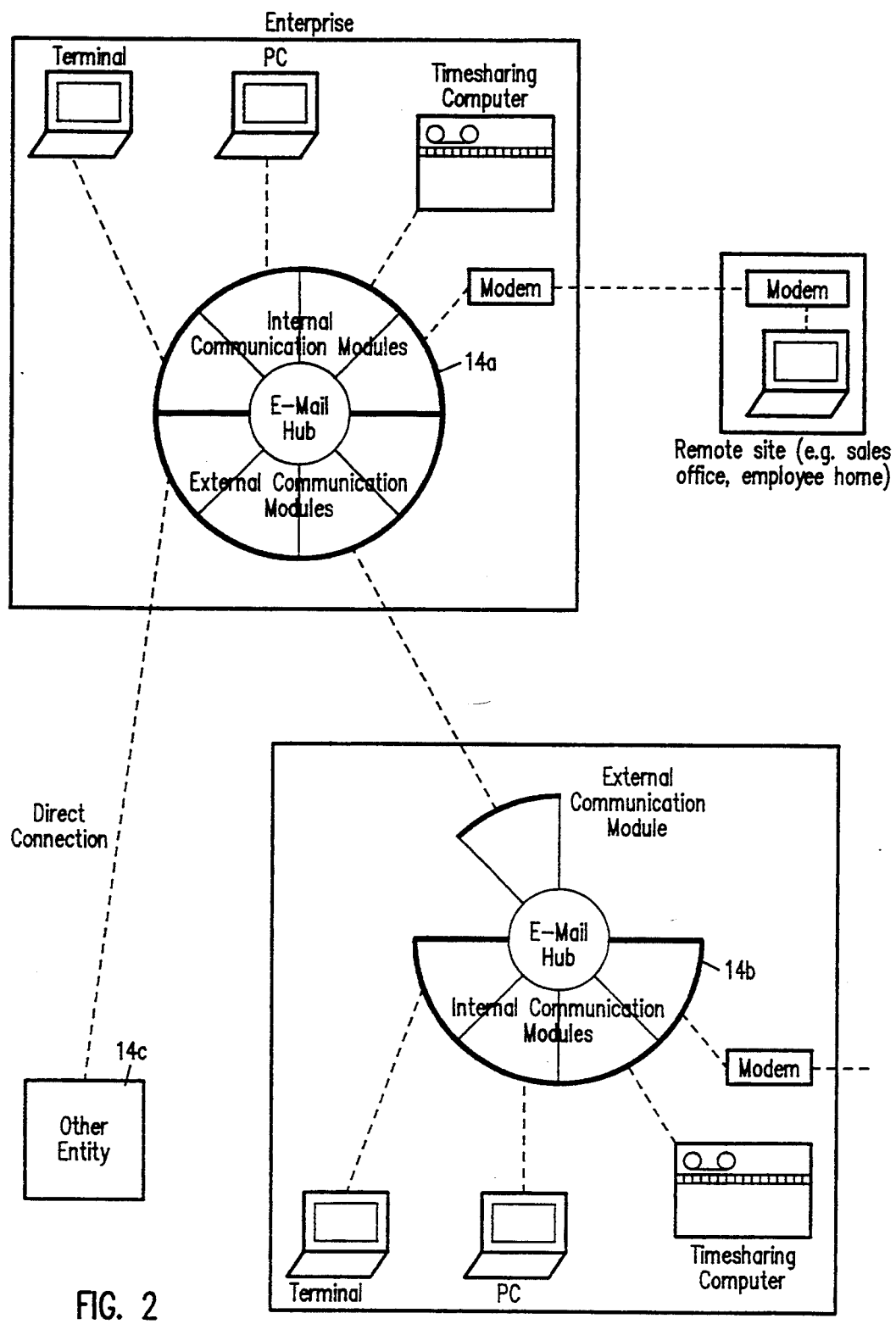
FIG. 2 is a drawing of an ECC network architecture according to an embodiment of the present invention.

Hub 14 has the capability to communicate either directly with off-the-shelf electronic mail systems or with other similar hubs located at other locations. Thus, a geographically distributed enterprise may choose to place one hub at each of its locations, and interconnect the hubs with one another, while at the same time realizing E-Mail connectivity with other entities which do not use a hub as described in this invention. FIG. 2 shows this situation with two locations equipped with hubs 14a and 14b. Hub 14b has been equipped with a single external communication module in order to communicate with hub 14a. Users at the location of hub 14b can not only communicate with users at the location of hub 14a, but also with any other users that are reachable via the other external communication modules of hub 14a. Thus Hub 14a operates as a mail exchange server for the personnel from the other location. Such a hub network can have any number of nodes, as long as there is a network path from any node to any other. Such a path need not be direct but may transit through intermediate hubs. Each of the inter-hub links can be realized using any one of multiple industry standard networking protocols such as TCP/IP, X.25 or DECnet.

Hub 14 may be accessed remotely to perform any desired system maintenance functions. Such functions may include creation and maintenance of on-line user directories, system upgrades and installation of additional system capabilities.

In the hub network, incoming messages are converted by the internal communication module 16 of the originating location's hub 14 to the internal format used by the hubs. The originating location's hub examines the destination address of the message to determine the appropriate other hub to which the message should be sent, and sends it without any format conversion. The receiving hub also examines the message to determine which of its internal communication modules 16 is required for each recipient of the message, and passes a copy of the message to each of the required modules 16 to convert and deliver the message in the proper format to each destination user.

HUB hardware can be any mainframe, mini, or microcomputer with sufficient memory and speed to handle the tasks herein described. In a preferred embodiment of the invention, the HUB comprises a MicroVAX/VMS microcomputer manufactured by Digital Equipment Corporation (DEC) of Maynard, Mass. System performance can be selectively scaled by choice of the HUB host computer. For example, the VAX microcomputer described above provides a range of operating speeds at up to eight million instructions per second.

Optionally, the HUB can be constructed as dual host configuration. The dual host configuration provides failure tolerance in case one of the host computers becomes inoperable. Spare room in each backplane is allotted to allow reconfiguration to a single-host configuration without loss of functionality.

The VMS operating system of the VAX computer allows use of several existing software programs to be employed in operation of the HUB. For example, the DEC Message Router software supports store and forward message routing; the DEC ALL-IN-1 mail software supports message formatting, and user directory services. Although the preferred embodiment uses the Message Router software, the invention may be implemented with any existing or specially designed software that performs the message routing. Formatting can be implemented using other off-the-shelf software, such as the VMSmail utility software included with the VMS operating system. Directory functions can be implemented using the VMS "SEARCH" command and a sequential text file containing one name and address per line. The exact software and format used are at the discretion of the local system administrator. Tables 2 and 3 list some of the commercially available software that may be used to configure the hub internal and external communications modules as well as the hub core and provides a description of the software useful for implementing the present invention. The hub software can also include functions providing the conversion of E-mail messages to voicemail messages or to facsimile transmissions. Other software than that listed in Tables 2 and 3 may be used to support the present invention. In addition, the invention need not contain all the features listed in Table 3 to be operative.

The internal communication modules may comprise commercially available software that converts the message format of the incoming message to the universal format of the hub. The internal communication modules convert the message text to ASCII format and delete any word processing encodings that may be imbedded in the message. For example, certain E-mail protocols permit bolding or underlining of text. These features are word processing encodings that are not necessarily transferrable between E-mail protocols.

Figure 3:
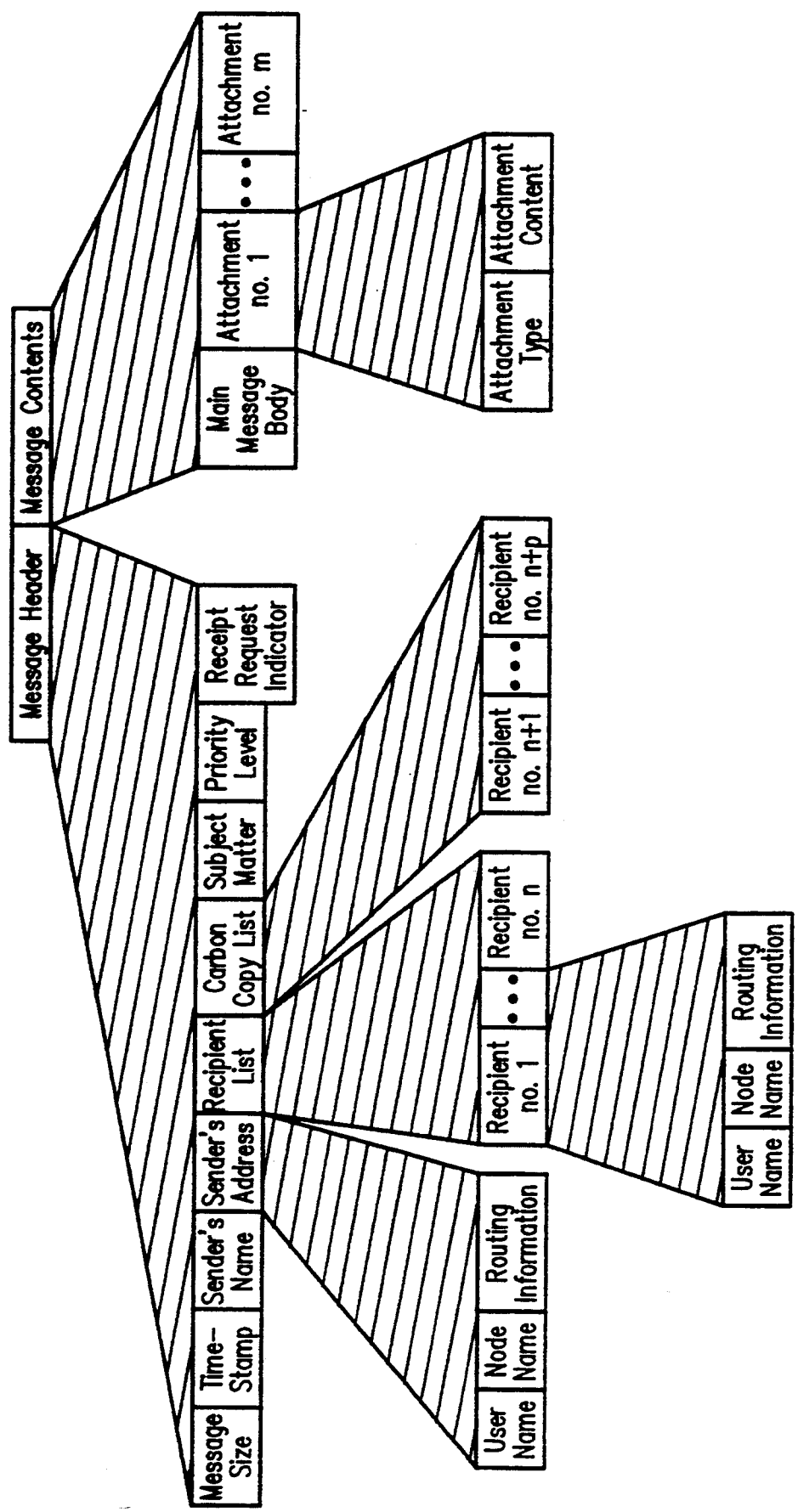
FIG. 3 is a conceptual diagram of a hub message format that can be realized by different embodiments of the present invention.

In addition, certain E-Mail protocols have unique message routing formats. The internal module converts the messages format into the format desired by the HUB. FIG. 3 shows a sample of a preferred message format that may be used by the HUB. The message consists of a message header 100 and a message body 102. The message header 100 contains at minimum the size of the complete message in bytes 100a, a timestamp 100b, the sender's name 100c, the sender's address 100d, a list of recipients 100e and a list of carbon copy recipients 100f, a subject matter 100g, and a number of indicators such as a priority level 100h and a receipt request flag 100i. The message body 102 consists of one or more parts, a main message body 102a and zero or more attachments 102b. Embodiments of this invention could specify fewer or more fields. Such additional information may include security information and error detection as known to those of skill in the art. In one preferred embodiment of this invention, the format of the message conforms to the X400 standard of the International Consultative Committee on Telephony and Telegraphy (CCITT). Table 3 also lists various commercially available software that may be used to convert one protocol to another. Other software conversions not listed in Table 3, commercially available or customized, may also be used with the present invention.

The message received into the HUB, is stored in a queue for later transmittal to the destination user. Messages are normally transmitted in first in first out fashion. If desired, messages can be encoded to take priority over other messages in the queue using techniques known to those of skill in the art. If the VAX/VMS system of the preferred embodiment is used, the DEC Message Router Software package may be used to perform the queuing, message routing, store and forward and prioritizing functions.

Messages are routed by hub 14 using either virtual or physical addressing. Depending on the external communication module being used to transmit the message to its destination, the message may be routed to a specific physical address (e.g. "DECnet node 12.13") or to a virtual address, (e.g., "Country: USA; Domain: National; User: John Smith") which a value added network provider maps to a physical address using techniques known to those of skill in the art.

Operational Example

Figure 4:
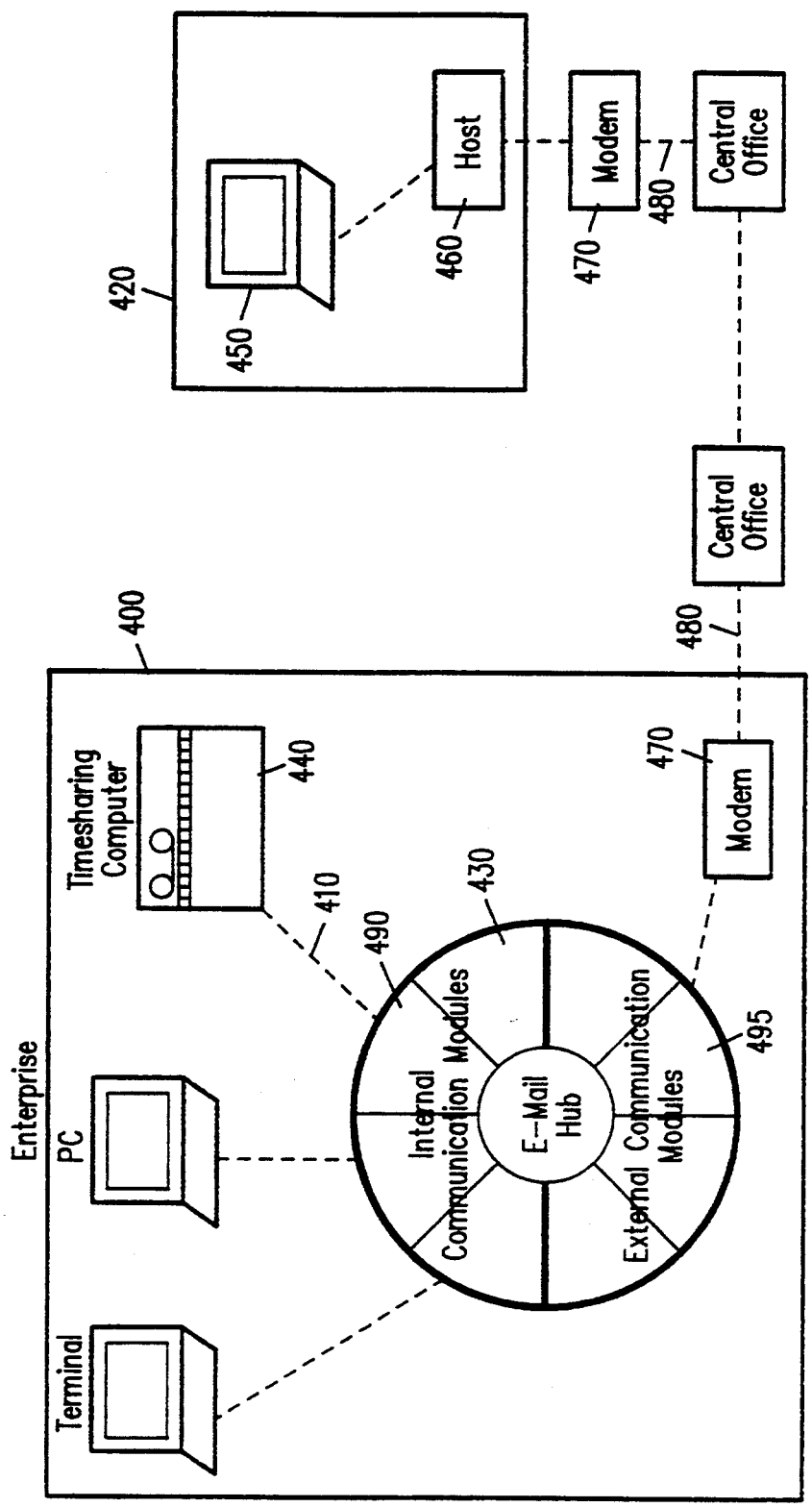
FIG. 4 is an example of interenterprise communication according to an embodiment of the present invention.

FIG. 4 illustrates two separate entities that wish to communicate electronically with one another. Entity 400 uses a variety of electronic mail applications, including the VMSmail software from Digital Equipment Corp. running on a timesharing computer 440. Entity 420 uses the PROFS software from IBM on a host computer 460 to which its personnel connect using terminals 450. A hub 430 is located within entity 400, whereas no hub or similar device is located within entity 420.

As an illustrative example, Joe, an engineer at entity 400, wishes to communicate with Erin, an engineer at entity 420. Joe invokes the VMSmail application running on timesharing computer 440 to send his message. Joe can locate Erin's address by calling up a directory of addresses stored on the timesharing computer he uses, and which is a copy of a central directory maintained in the hub 430 by the hub administrator for entity 400. This address may be maintained in a "physical" format, which explicitly includes the routing information needed by both host 440 and hub 430 to route the message. For example, the physical format may be HUB::PROFS::ENT420:ERIN, meaning "send the message to the hub, which will send it to the PROFS conversion module, which will send it to a computer called ENT420, which will deliver it to user ERIN". The address can also be maintained in a "virtual" format such as Erin_Jones, which points to an entry in system tables (maintained by the system administrator on hub 430 and periodically copied onto host 440) that associate the virtual address Erin_Jones to the physical address previously shown.

Figures 5A, 5B:
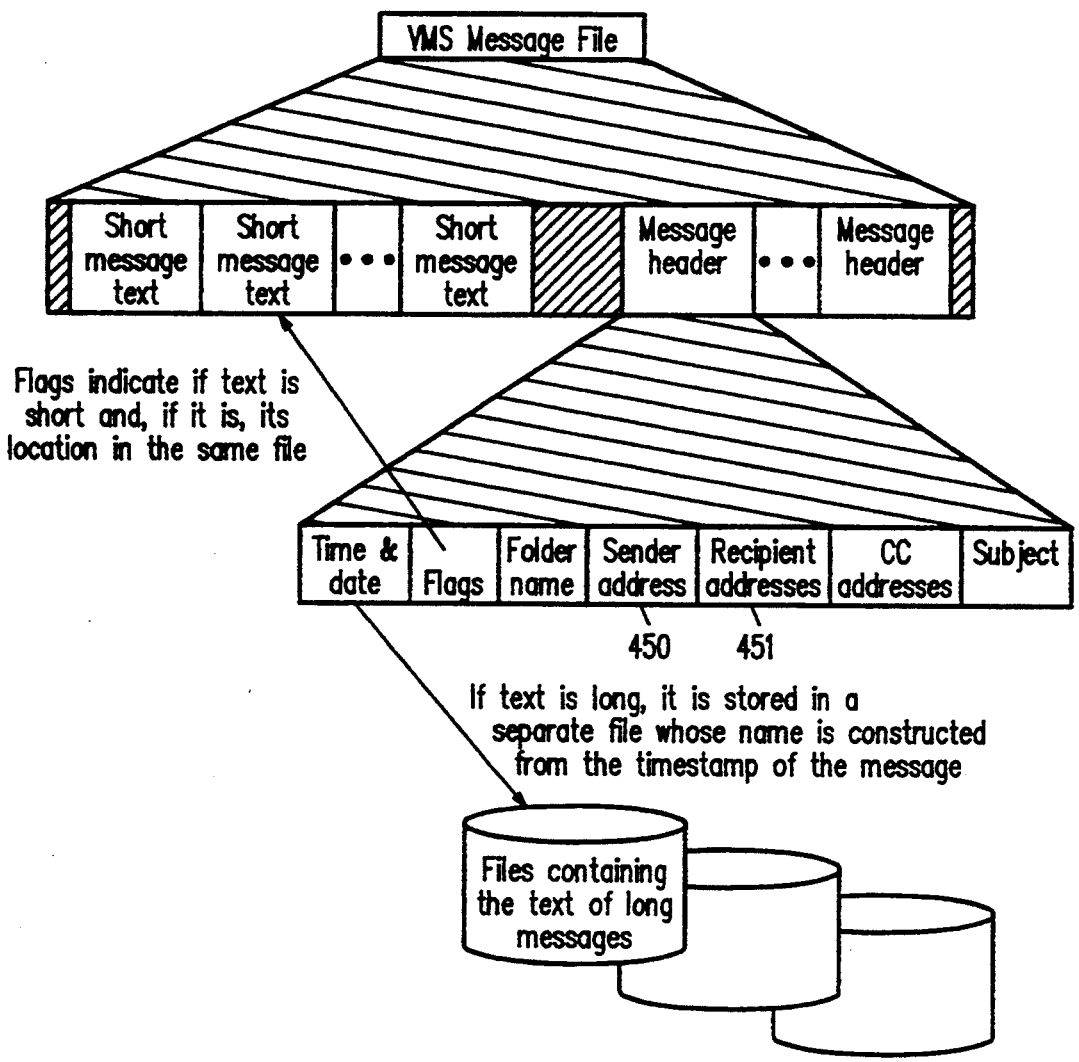
FIG. 5A is a diagram of a message format created by a user of the VMS system from Digital Equipment Corp.
FIG. 5B is a reproduction of a message sent from a user using the VMS mail format of FIG. 5A.

After entering Erin's address, Joe types his message and executes the send command according to the normal procedures associated with the VMS mail application. At this point, the message sent by Joe is stored in the format depicted by FIG. 5A and its appearance on screen is as shown in FIG. 5B. The visible elements of the message header include the date and time, the sender's name and local address 450, the receiver's address 451, and the subject matter. This information is followed by the text of the message proper.

The VMS mail software determines that the recipient's address is to be reached via the hub 430, and sends the message via connection 410 to the internal communication module 490, which supports the VMS mail format and the underlying communication protocol, in this case Digital's DECnet. Module 490 converts the message's format into the internal format used by the hub and submits it to a first component of the hub software, which places the message in the hub's message queue. At this point, Joe's message has the format described in FIG. 6, with the recipient list consisting of a single address 458, which may now be in the form ERIN@ENT420@PROFS.

Figures 6, 7B:
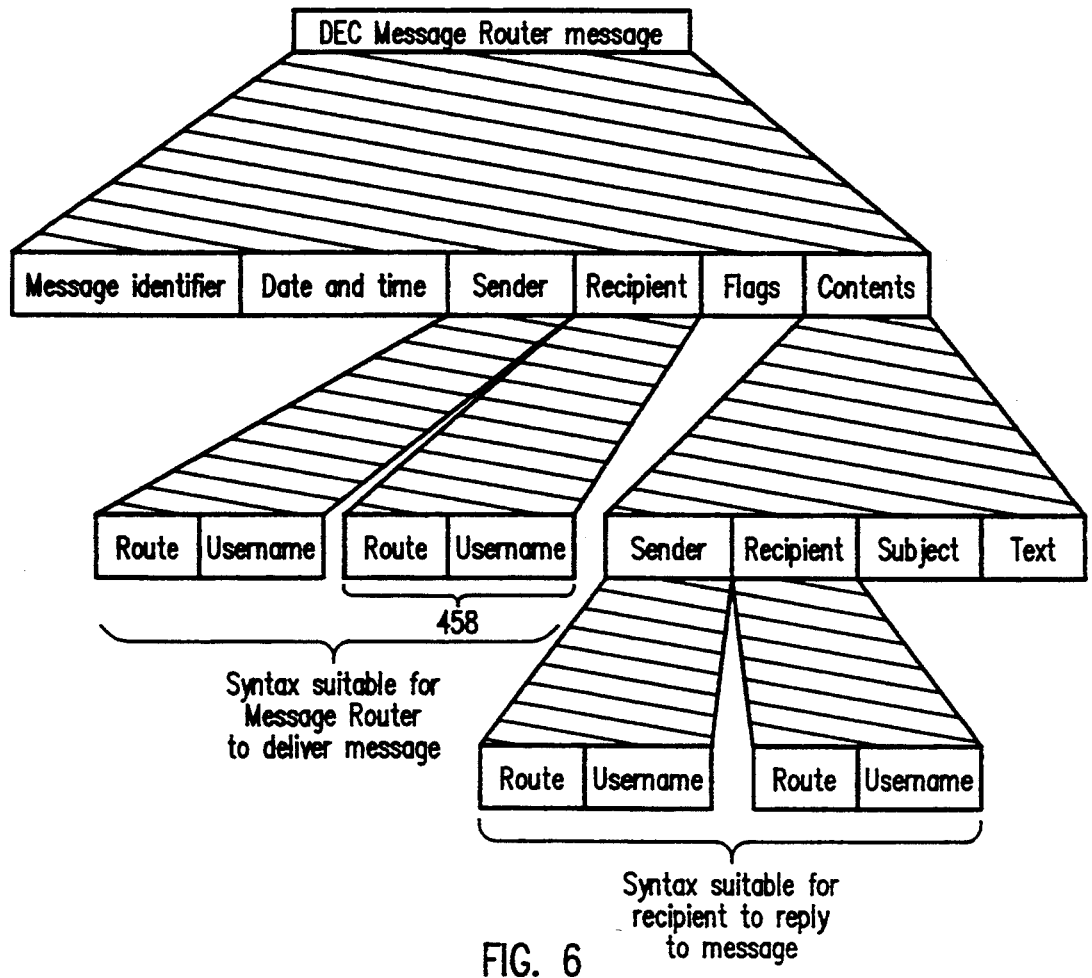
FIG. 6 is a diagram of a hub message format according to an embodiment of the present invention.
FIG. 7B is a reproduction of a message received by a user using PROFS format.

After conversion into the format of FIG. 6, messages of equal priority are removed from the queue in first-in, first-out order by a second component of the hub's software. This second component examines the address and further determines that because the recipient of the message is located at entity 420, the message must be processed by external communication module 495. The second component therefore submits the message to module 495. The external communication module converts the message to the PROFS format. This process includes modifying both the sender's and the recipient's addresses to a PROFS-compatible syntax, and stripping the text of the message of any codes which may have been included in the original message but would not be understood by the PROFS application. External communication module 495 then sends the reformatted message to timesharing computer 460 using the proper data communication protocol, in this case IBM's SNA.

In the case illustrated in FIG. 4, external communication module 495 and computer 460 are permanently and directly connected via telephone lines 480 and modems 470, an arrangement which is suitable in many cases and in particular between two divisions of the same company or organization. The telephone connections are made through central offices of the telephone companies according to procedures known to those of skill in the art. If however there are security concerns that require increased isolation between entity 400 and entity 420, the communication path could include links through a value-added network which relays messages in a fashion that provides such isolation.

If external communication module 495 successfully completes the task of sending the message to host computer 460, as signaled to it by the lower layers of the networking protocol, it signals to the hub software that the message can be permanently removed from the queue. In addition, if the header of the message was marked with a request for receipt acknowledgement, module 495 generates a new E-Mail message destined to Joe. This message arrives in Joe's mailbox a short interval after Joe has executed the send command and may have the form "Your message to Erin dated . . . with subject '. . .' has been delivered."

If, on the contrary, communication module 495 receives an error code from the network protocol layer to the effect that delivery of the message failed, module 495 signals to the hub software that this error has occurred. The hub software places the message back in the message queue instead of deleting it, and starts keeping a "retry count" for this message. The hub 430 makes renewed attempts to send this message at intervals specified by a parameter which can be set by the system administrator, and for a total number of tries which is also settable. If this maximum retry count is reached without success, the hub 430 returns the message to Joe, preceded by an error notification which may take the form "Your message to Erin dated . . . with subject '. . .' could not be delivered. The text of your original message follows."

Figure 7A:
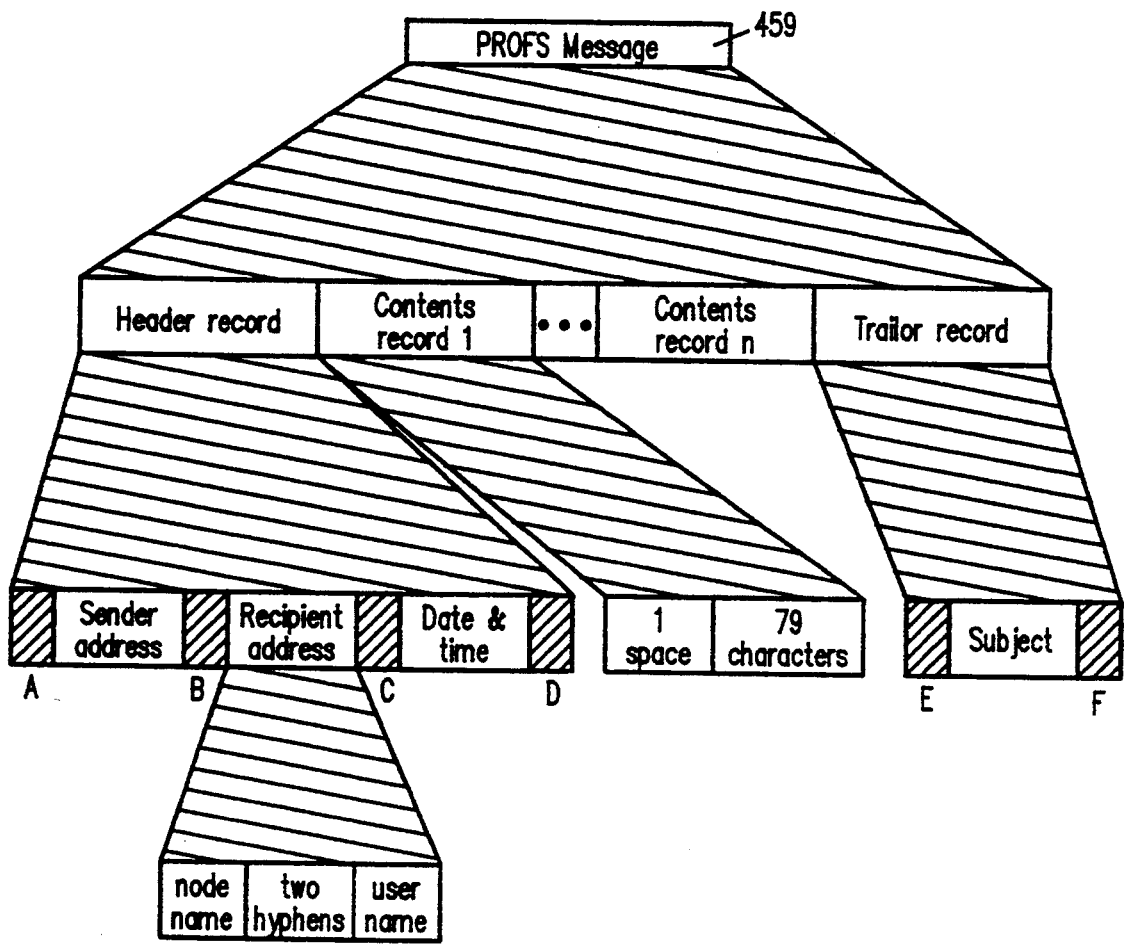
FIG. 7A is a diagram of a message format as seen by a recipient using the IBM PROFS System.

Assuming that delivery succeeds, whether on the first attempt or on a subsequent one, host computer 460 receives a message which, in all respects, appears as if it were generated by another IBM machine using the PROFS application. Therefore, no conversion needs to take place, and the message is simply routed to Erin in the same fashion as other electronic messages processed by host computer 460. When Erin invokes the PROFS application, using her "dumb" terminal 450 which is directly hardwired to host 460, she reads a PROFS E-Mail message which is stored in the format 459 shown in FIG. 7A and appears on her screen as shown in FIG. 7B.

If Erin wishes to send a message to Joe, possibly a reply to his message to her, the sequence described above is repeated, only in reverse. Because there is no hub 430 in Erin's entity, a directory of user addresses must be maintained directly on host computer 460 by its system administrator, or a user like Erin needs to know Joe's electronic mail address. A list of addresses for users located at entity 400 may be periodically sent by the system administrator of hub 430 to the system administrator of computer 460, and the addresses can be converted by either the sender or the receiver of the list from the format used on hub 430 to the format used on computer 460, either manually or using a computer program which can easily be written by any programmer.

Following the reverse path to the one described earlier, Erin's message will appear among Joe's new messages under the VMS mail application. Optionally, the hub 430 can support voice access to messages. If Joe is away on business when Erin's reply arrives, Joe can phone a number which connects him to an additional module of the hub 430. This additional module can ask Joe, through a succession of voice prompt, to identify himself through a touch-tone keypad. The hub 430 can retrieve Erin's message from the message queue and encode it into a voice message using techniques of voice synthesis well known to those of skill in the art.

Other Features

Although the present invention has been described in the context of an E-Mail system, the present invention is not limited to E-Mail. Fax mail and voice mail systems may be linked in a similar fashion to that described for the E-Mail system. Messages are routed to a hub where the messages are converted to a standard format used by the hub. The message is then given a virtual or physical address and queued for later delivery to the destination address. An external communication module can be used to convert the voicemail or faxmail message to the format required by the destination user. A communication network provided by a common carrier or a value added network can be used to transmit the message prepared by the external communication module to its destination.

Conclusion

Preferred embodiments of the present invention have now been described. Variations and modifications will be readily apparent to those of ordinary skill in the art. For example, other software systems than those specifically mentioned herein may be used with the present invention. For this reason, the invention should be construed in light of the claims.

TABLE 1

Internal User Access Alternatives

Asynchronous terminal (e.g. DEC VT-220 or compatible) directly connected to the hub.

Asynchronous terminal (e.g. DEC VT-220 or compatible) connected to a terminal server, which itself is attached to an Ethernet local area network to which the hub is also connected.

Computer workstations (running the UNIX or VMS operating system) attached to an Ethernet local area network to which the hub is also connected.

Personal computers (IBM PC or compatible, or Apple Macintosh) attached to an Ethernet local area network to which the hub is also connected.

Asynchronous terminal, or personal computer equipped with (a) software emulating an asynchronous terminal (e.g. Kermit, Reflection, Mac240, etc.) and (b) a communication modem allowing dial-up to another modem connected to the hub, optionally with security features such as dial-back protection.

Asynchronous terminal, or personal computer equipped with (a) software emulating an asynchronous terminal (e.g. Kermit, Reflection, Mac240, etc.) and (b) a communication modem allowing dial-up to another modem connected to a value-added network such as AT&T's Accunet or Sprint Communications Sprint Net, to which the hub is itself connected through another pair of modems and a separate communication line, and which may optionally provide for additional user authentication procedures.

Any computer system fully configured with the software and means of access necessary to provide its users with an electronic mail application between themselves, and which is connected to the hub in such a fashion as to use it solely as a gateway node.

External Link Configuration Alternatives

A direct local connection to the Internet network, through an Internet Protocol (IP) routing device (e.g. a CISCO router)

A connection between the Ethernet to which the hub is connected, and another Ethernet network, e.g. at a local university, on which there exists a computer node or an IP routing device connected to the Internet.

A dial-up, periodic connection to a relay node, using the UUCP protocol, and controlled by UUCP emulation software such as Innosoft's PMDF or similar software.

A connection to a value-added network such as Sprint Communications' SprintNet, AT&T's Accunet, or British Telecommunications Tymnet, using the following components:
CCITT X.25 emulation software (such as Digital Equipment's PSI package)
a synchronous communication modem
a dedicated communication line to the network's closest point of presence.

External Link Configuration Alternatives

A dial-up, periodic connection to a mailbox service, such as Western Union's Easylink or MCI's MCImail, using the following components:
an asynchronous communication modem connected to a telephone line
an asynchronous terminal connection to the hub
software, such as Western Union's Office Access in the case of Easylink, permitting the exchange of stored sets of messages between a message queue located at the hub and another message queue located at the provider of the service.

A dedicated communication line to a remote computer or hub, using a communication protocol which is compatible with the electronic messaging format shared by one of the hub's external communications modules and the remote computer or hub; examples of such communication protocols are DECnet, TCP/IP, or SNA.

A facsimile transmission subsystem, composed of:
an electronic circuit board, installed directly in the hub computer or in a microcomputer or personal computer connected to the hub,
a facsimile communication modem, which may be in the form of an additional circuit on said board,
software capable of transforming an electronic message into a facsimile transmission according to CCITT Group 3 or Group 4 protocols, including the capability to extract the number of a remote FAX machine specified as the recipient's address in the message header.

Such facsimile transmission subsystems include Wilco Software's AUTOFAX, or products from GammaFAX.

A telex transmission subsystem, composed of:
an electronic circuit board, installed directly in the hub computer or in a microcomputer or personal computer connected to the hub,
a telex communication modem, which may be in the form of an additional circuit on said board,
software capable of transforming an electronic message into a telex transmission according to the appropriate CCITT protocols, including the capability to extract the number of a remote telex machine specified as the recipient's address in the message header.

Such telex transmission subsystems include Digital Equipment Corp's MR/Telex.

TABLE 2

Hub Internal Components (in one particular embodiment)

Digital Equipment Corp. VAX or MicroVAX hardware with appropriate internal memory, magnetic disks for file storage, secondary storage for software installation and file backup purposes VMS operating system, including the VMSmail electronic mail utility (for use by users of directly connected terminals or dial-up users), and the SEARCH utility to provide an electronic address directory query capability on the hub.

Digital Equipment Corp's Message Router (for storage and management of a message queue)

DEC's MR/X (Message Router/X.400), for the exchange of messages according to the X.400 format DEC's PSI (Packetnet System Interface), for emulation of the X.25 protocol, required to support (a) the PSImail electronic mail format, (b) the X.400 electronic mail format, (c) incoming calls dialed through a value-added network using the X.29 protocol DEC's MR/P (Message Router/PROFS), for the exchange of messages according to the PROFS format DEC's VMS/SNA, for emulation of the SNA protocol defined by IBM, required to support the PROFS electronic mail format DEC's DECtalk, for voice access to messages

TABLE 3

| COMPONENT NAME | VENDOR NAME & ADDRESS | FUNCTION |
| --- | --- | --- |
| Accunet | American Telegraph and Telephone New York, NY | Value-added network |
| ALL-IN-1 | Digital Equipment | Office automation |

TABLE 3-continued

| COMPONENT NAME | VENDOR NAME & ADDRESS | FUNCTION |
| --- | --- | --- |
| | Corporation<br>Maynard, MA | application software |
| ALL-IN-1 Mail | Digital Equipment<br>Corporation<br>Maynard, MA | A subset of ALL-IN-1 that provides the electronic mail functionality within it |
| AutoFax | Wilco International<br>Jersey City, NJ | Hardware and software providing E-Mail to FAX conversion and transmission |
| Cisco Router | Cisco Systems, Inc.<br>Mountain View, CA | Communication hardware to bridge two networks to one another, e.g. an Ethernet network to Internet |
| DECnet | Digital Equipment<br>Corporation<br>Maynard, MA | Communication protocol |
| Dectalk | Digital Equipment<br>Corporation<br>Maynard, MA | Software and hardware to provide a voice rendition of a text message |
| Easylink | Western Union Int'l<br>Piscataway, NJ | Service providing an electronic mailbox to which messages destined to other users can be uploaded via modem, and messages waiting for a user can be downloaded via modem. |
| Ethernet | Various Vendors | Local area network communication protocol |
| GammaFAX | Gammalink<br>Sunnyvale, CA | Hardware providing E-Mail to FAX conversion and transmission |
| Internet | Various Vendors | A global communication network consisting of a federation of networks |
| Kermit | Columbia University<br>New York, NY | Software providing terminal emulation and a file transfer protocol for personal computer. |
| MacIntosh | Apple Computer, Inc.<br>Cupertino, CA | Personal computer |
| Mac240 | Claris Software<br>San Jose, CA | Software providing terminal emulation and a file transfer protocol for Apple Macintosh personal computers |
| MCImail | MCI Communications<br>Corp<br>Washington, DC | Service providing an electronic mailbox to which messages destined to other users can be uploaded via modem, and messages waiting for a user can be downloaded via modem. |
| Message Router | Digital Equipment<br>Corporation<br>Maynard, MA | Storage and management of a queue of electronic messages |
| MicroVAX | Digital Equipment<br>Corporation<br>Maynard, MA | Collective name of several smaller, models of VAX computers (e.g. Micro VAX-3100, Micro VAX-3500) |
| MR/P | Digital Equipment<br>Corporation<br>Maynard, MA | Software that converts electronic mail from the Message Router format to the |

TABLE 3-continued

| COMPONENT NAME | VENDOR NAME & ADDRESS | FUNCTION |
|---|---|---|
| MR/TELEX | Digital Equipment Corporation Maynard, MA | PROFS format Software that converts electronic mail from the Message Router format to the telex format |
| MR/X | Digital Equipment Corporation Maynard, MA | Software that converts electronic mail from the Message Router format to the X.400 format |
| PC | International Business Machines Armonk, NY | Personal computer |
| PMDF | Innosoft International Inc. Claremont, CA | Software that can convert a VMSmail message into a variety of formats and send it over various protocols, including UUCP |
| PostScript | Adobe Systems, Inc. Mountain View, CA | Page description format which allows graphics to be stored and transmitted as text |
| PROFS | International Business Machines Armonk, NY | Electronic messaging application |
| PSImail | Digital Equipment Corporation Maynard, MA | Name given to a form of VMSmail message transmission over an X.25 communication link using the PSI software |
| Reflection | Walker Richer & Quinn Inc. Reflection Software Seattle, Washington | Software providing terminal emulation and a file transfer protocol for personal computers |
| SEARCH | Digital Equipment Corporation Maynard, MA | A utility in the VMS operating system which displays lines in a text file which contain a pattern of characters given by the user |
| SNA | International Business Machines Armonk, NY | Communication protocol |
| SprintNet | Sprint International Communications Corp Reston, VA 22096 | Value-added network |
| TCP/IP | Various Vendors | Communication protocol |
| Tymnet | British Telecom USA Holdings Wilmington, DE | Value-added network |
| Unix | American Telephone & Telegraph Co. New York, NY | Operating system |
| UUCP | Various vendors | Protocol for file exchange between Unix systems, often used when the link between these systems is occasional |
| VAX | Digital Equipment Corporation Maynard, MA | Collective name of a family of minicomputers from DEC |
| VMS | Digital Equipment Corporation Maynard, MA | Operating system |
| VMSmail | Digital Equipment Corporation Maynard, MA | Software utility for electronic mail |
| VT-220 | Digital Equipment Corporation Maynard, MA | Asynchronous data terminal |
| X.25 | CCITT | Standard for data |

TABLE 3-continued

| COMPONENT NAME | VENDOR NAME & ADDRESS | FUNCTION |
|---|---|---|
| X.400 | CCITT | communications Standard for electronic mail exchange |

What is claimed is:

1. An electronic message communications system for communicating between and within enterprises comprising:
   a plurality of users contained within said enterprises, each of said users adapted to exchange electronic messages;
   a plurality of communication apparatus external to said enterprises, each of said communication apparatus adapted to exchange electronic messages;
   said electronic messages having one of a plurality of message formats uniquely associated with a respective one of said users or a given one of said communication apparatus;
   a hub including:
   a) a plurality of internal communications modules for transmitting and receiving said electronic messages from said users external to said hub and contained within said enterprises,
   b) a plurality of external communications modules for transmitting and receiving said electronic messages from said plurality of communication apparatus external to said hub and external to said enterprises;
   c) each of said internal communications modules and said external communications modules includes means for translating said messages between said message format and a standard format; and
   d) a message router device coupled to each of said internal communications modules and external communications modules, to establish a routing path to route messages in said standard format between said internal and said external communications modules.

2. The system of claim 1, wherein said hub comprises a microcomputer.

3. The system of claim 1, wherein said hub comprises a dual host computer system.

4. The system of claim 1, wherein said hub further comprises a computer having an electronic mail software package for facilitating electronic mail transmission.

5. The system of claim 1, further comprising:
   means for accessing said hub from a remote location to perform system management functions including creation and maintenance of a directory of addresses for origination and receipt of said electronic message.

6. An electronic communications hub comprising:
   a) a plurality of internal communications modules for transmitting and receiving messages from a device external to said hub and contained as part of a local network,
   b) a plurality of external communications modules for transmitting and receiving messages from a plurality of apparatus external to said hub and external to said local network;
   c) each of said messages having one of a plurality of message formats uniquely associated with a respective one of said internal communications modules and said external communications modules;
   d) each of said internal communications modules and said external communications modules includes means for translating said messages between said message format and a standard format; and
   e) a message router device coupled to each of said internal communications modules and external communications modules, for routing messages in said standard format between said internal communications modules and said external communications modules.

7. The hub of claim 6, wherein said hub comprises a microcomputer.

8. The hub of claim 6, wherein said hub comprises a dual host computer system.

9. An electronic message communication system comprising:
   at least a first, a second, and a third user, each of said users having means for exchanging electronic messages with each of said other users, said electronic messages having one of a plurality of message formats uniquely associated with a respective one of said users;
   at least a first and a second hub, said first hub connected to said at least first and second users, said second hub connected to said at least third user, each of said first and second hubs having:
   (a) a plurality of communications modules coupled to each of said users, for transmitting and receiving said electronic messages and translating between said plurality of message formats and a standard format;
   (b) means, coupled to said plurality of communications modules, for routing messages within said first and second hubs, in said standard format between said plurality of communications modules for delivery to a selected user; and
   a communications link directly connecting a first one of said communications modules in said first hub and a communications module in said second hub.

10. The system of claim 9, wherein at least one of said first and said second hubs comprises a microcomputer.

11. The system of claim 9, wherein at least one of said first and said second hubs comprises a dual host computer system.

12. A method for transmitting messages between user devices in different enterprises, each of said enterprises having at least one hub, each hub having a plurality of communications modules, each of said user devices requiring distinct message formats, the method comprising the steps of;
   transmitting, from a first user device, a message of a first format to a first communications module in a hub in a first enterprise;
   receiving, in said first communications module, said message of first format;
   translating, in said first communications module, said message of first format to a message of standard format;

transferring said message of standard format from said first communications module to a second communications module based on destination information contained in said message of standard format;

translating in said second communications module, said message of standard format to a message of a second format; and transmitting, from said second communications module of said hub in said first enterprise, said message of second format to a hub in a second enterprise based on destination information contained in said message of second format.

13. The method of claim 12, further comprising the steps of:

receiving, in a third communications module in said hub of said second enterprise, said message of second format; and transferring, from said third communications module in said hub of said second enterprise to a destination, said message of second format based on destination information contained in said message of second format.

14. The method of claim 12, further comprising the steps of:

receiving, in a third communications module in said hub of said second enterprise, said message of second format;

converting, in said third communications module in said hub of said second enterprise, from said message of second format to a message of standard format;

receiving, in a fourth communications module of said hub of said second enterprise, said message of standard format and converting said message of standard format to a message of a third format; and transmitting said message of third format from said fourth communications module in said hub of said second enterprise, to said second user device.

15. The method of claim 12, wherein said step of translating said message of first format to a message of standard format further comprises the steps of:

converting said message to ascii text;

removing, from said message, any bolding and underlining word processing encodings; and converting from the message routing format of said message of first format to a message routing format of said message of standard format.

16. An electronic communications hub comprising:

a) a plurality of communications modules for transmitting and receiving messages from devices external to said hub;

b) each of said messages having one of a plurality of message formats uniquely associated with a respective one of said devices and one of said plurality of communications modules;

c) each of said communications modules includes means for translating said messages between said message format and a standard format;

d) a message router device coupled to each of said communications modules, for routing messages in said standard format between said communications modules; and e) wherein messages are routed in standard format within said hub and messages exiting said hub are translated from said standard format to one of said plurality of message formats uniquely associated with a destination device.

* * * * *